United States Patent

Suzuki et al.

[11] 4,208,735
[45] Jun. 17, 1980

[54] MOVING SOUND SOURCE IDENTIFYING SYSTEM

[75] Inventors: Fumiyoshi Suzuki, Kawasaki; Fumiyoshi Sasaki, Tokyo; Guén Nishinomiya, Kawasaki, all of Japan

[73] Assignee: Nippon Hoso Kyokai, Tokyo, Japan

[21] Appl. No.: 893,821

[22] Filed: Apr. 5, 1978

[30] Foreign Application Priority Data

Apr. 15, 1977 [JP] Japan .................. 52-42710

[51] Int. Cl.² .............................................. H04B 1/06
[52] U.S. Cl. ..................................... 367/136; 367/125
[58] Field of Search ................. 340/16 R; 343/100 CL

[56] References Cited

U.S. PATENT DOCUMENTS

| 2,166,991 | 7/1939 | Guanella | 340/16 R X |
| 3,145,341 | 8/1964 | Andrew | 340/16 R X |
| 3,182,283 | 5/1965 | Ellingson et al. | 343/100 CL |
| 3,750,152 | 7/1973 | Waful | 343/100 CL |
| 3,763,465 | 10/1973 | Tatge et al. | 343/100 CL |
| 3,852,706 | 12/1974 | Barney et al. | 340/16 R |
| 3,947,803 | 3/1976 | Brown | 340/16 R X |

Primary Examiner—Richard A. Farley
Attorney, Agent, or Firm—Stevens, Davis, Miller & Mosher

[57] ABSTRACT

A moving sound source identifying system wherein a correlation function signal between two sound signals derived respectively from two microphones arranged apart from each other on the ground for respectively receiving sounds which are simultaneously emitted by a sound source is used for identifying whether the sound source is moving or stationary and whether it is flying or moving on the ground, by means of discriminating the variation of respective times whereat maximum or minimum levels of the correlation function signal appear, which variation is caused in accordance with the angle of elevation of the sound source. Continuously obtained results of the identification are utilized for classifying sound sources, removing the noise disturbance and automatically pursuing the sound source.

8 Claims, 11 Drawing Figures

MOVING SOUND SOURCE IDENTIFYING SYSTEM

BACKGROUND OF THE INVENTION (1) Field of the Invention

The present invention relates to a moving sound source identifying system wherein an incoming direction of sounds emitted from a sound source, particularly a noise source, which is moving in a vertical plane or in a horizontal plane can be discriminated, and whether the sound source is moving or stationary can be identified.

(2) Description of the Prior Art

Figure 1:
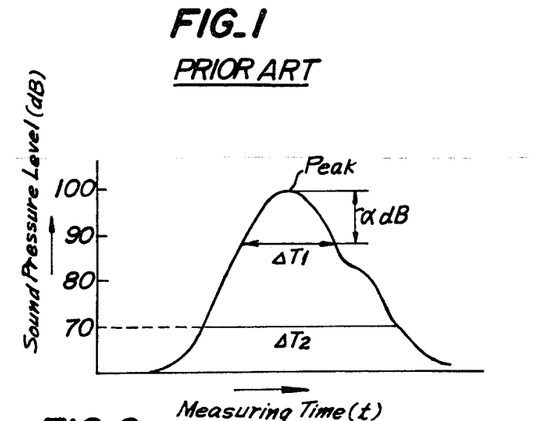
FIG. 1 is a graph showing a conventional manner whereby the identification of a moving sound source is conducted.

For the purpose of the identification of a moving sound source and the discrimination of the incoming direction of sounds emitted from the moving sound source in a conventional manner as shown in FIG. 1, a mountain-shaped variation of sound pressure levels of sounds, generally noises, emitted from the moving sound source, is simply measured. The sound pressure level variation is caused with the lapse of time in accordance with primary approach and secondary departure of the moving sound source relative to the measuring position. The time length $\Delta T_1$ between the points whereon the sound pressure levels are reduced by a predetermined amount $\alpha$dB from the peak of the aforesaid mountain-shaped variation, or the time duration $\Delta T_2$ wherein the sound pressure levels exceeding a predetermined level can be obtained for identification.

However, the conventional manner as mentioned above has the serious defect that all of sounds emitted from various sound sources, which satisfy the above-mentioned conditions, are regarded as those emitted only from the same sound source, regardless of the types of the various sound sources, for instance, either a moving source or a stationary source, or, either a source flying in the sky or a source moving on the ground. Accordingly, even if it is desired to conduct the measurement only with respect to the noise emitted from an aircraft flying in the sky, similar results of the measurement can be obtained also with respect to the noise emitted from a vehicle, for instance, a motorcar, which is running on the ground close to the measuring position, so that it is impossible to identify the moving sound source, that is, the flying aircraft.

In order to more accurately identify a moving sound source a great many persons and hours must be used for the measurement, and, in addition various sound sources remain identified by means of an artificial measure, that is, the auditory sense.

SUMMARY OF THE INVENTION

An object of the present invention is to remove the above-mentioned defects of the conventional manner of identifying the moving sound source, and to provide a moving sound source identifying system wherein it is easy to conduct the measurement for identifying sound sources, even though the measuring environment is severe, for instance, too late at night, too early in the morning, intensely cold and intensely hot, and to identify the moving sound source, even though there exists a very high level of background noise on the measuring position.

Another object of the present invention is to provide a moving sound source identifying system wherein it is possible to conduct the automatic discrimination between a sound source moving on a horizontal plane parallel with the ground, that is, a motorcar or a train, and one moving on a vertical plane perpendicular to the ground, that is, a flying aircraft, and further between those mentioned above and a stationary sound source positioned in a vertical plane, for instance, a siren.

Still another object of the present invention is to provide a moving sound source identifying system wherein it is possible to automatically pursue a moving sound source.

Summarily speaking, the present invention provides a moving sound source identifying system wherein a correlation function signal between two sound signals derived respectively from two microphones arranged apart from each other on the ground for detecting respectively sounds emitted from a noise source is used for identifying whether the noise source is moving or stationary and whether it is flying or moving on the ground, by means of discriminating the variation of respective times whereat maximum or minimum levels of the correlation function signal appear, which variation is caused in accordance with the angle subtended between a horizontal or vertical line and the direction in which the noise source is looked for at the measuring position. Continuously obtained results of the identification are utilized for classifying the noise source, removing the noise disturbance, and automatically pursuing the noise source.

In order that the present invention may be readily carried into effect, preferred embodiments thereof will be described in detail, by way of example, with reference to the accompanying drawings.

BRIEF DESCRIPTION OF THE DRAWINGS

FIGS. 3(a), (b), (c), (d) and (e) are graphs showing successively the state of variations of a waveform of the correlation function signal obtained by the above embodiment;

DESCRIPTION OF THE PREFERRED EMBODIMENTS

Figure 2:
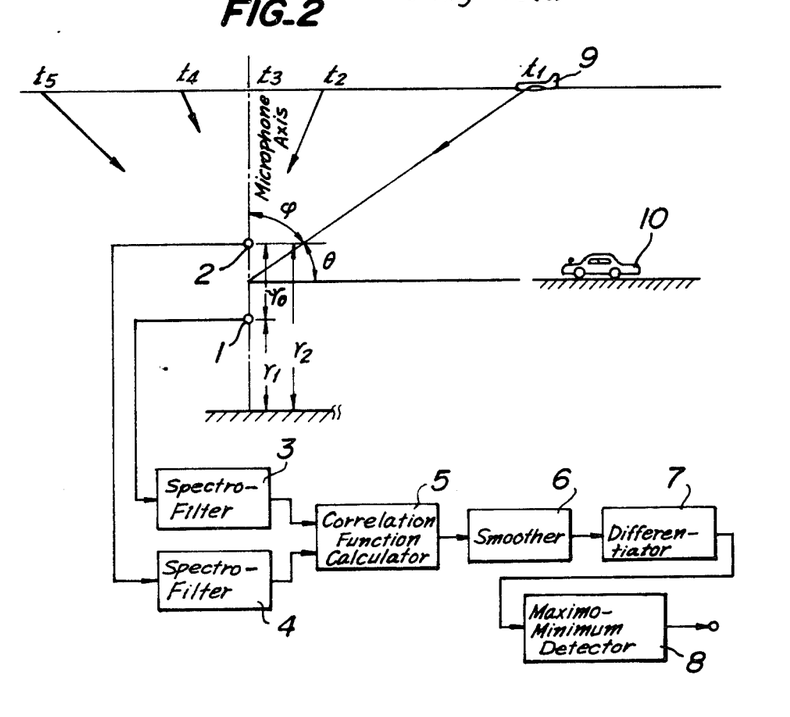
FIG. 2 is a block diagram showing a preferred embodiment of the moving sound source identifying system according to the present invention.

In the first place, an example of the basic configuration of the moving sound source identifying system is shown in FIG. 2. In the configuration shown in FIG. 2, two microphones 1 and 2, which are preferably omnidirectional, are arranged on an axis oriented in a direction perpendicular to the ground with a distance $r_0$ from each other, the heights thereof being $r_1$ and $r_2$ respectively. Two sound signals corresponding respectively to the sounds received by those microphones 1, 2 respectively, which are emitted from a distant sound source, for instance, an aircraft 9 flying in the sky or a motorcar 10 running on the ground, are supplied to two spectro-filters 3 and 4 respectively. In these spectro-filters 3, 4, the frequency filtering characteristics of which coincide with that of the spectrum of the sound emitted from the sound source, for instance, a flying aircraft 9, the frequency components representing the feature of the aimed sound source are extracted in an emphasized state respectively out of those two sound signals. The extracted frequency components are applied to a crosscorrelation function calculator 5, wherein a short interval crosscorrelation function with regard to those two sound signals emitted from the sound source is calculated in a well-known conventional manner. In the crosscorrelation function calculator 5, the above frequency components of those two sound signals derived from the two microphones 1 and 2, respectively are sampled at an appropriate period, for instance, of 100 μs, and two groups of sampled signal levels obtained within a predetermined short interval having an appropriate time length are registered respectively in a device for successively storing sampled signal levels, for instance, a shift register, in the successively renewed state.

In succession thereto, at every measuring time point which is predetermined at an adequate interval, respective products are calculated between successive sampled signal levels derived in parallel from the storing device, which belong to one group of sampled signal levels corresponding to one of those two microphones, for instance, the microphone 2, and which precede and succeed successively a sampled signal level which is positioned at a center of the other group of sampled signal levels corresponding to the other microphone 1 and is derived from the storing device as the standard, and this standardized signal level. As a result of the above calculation, the crosscorrelation function between sound signals derived respectively from the two microphones 1 and 2 can be obtained in a form of an ensemble average of the above calculated respective products with regard to the above predetermined short interval.

Before proceeding further, an autocorrelation function of an information signal, for instance, a sound signal will be explained.

In the case where $x_{(t)}$ represents a function showing a stationary stochastic process, an ensemble average $\psi_{(\tau)}$ of $x_{(t)} \cdot x_{(t+\tau)}$ which is defined by $$\psi_{(\tau)} = \overline{x_{(t)} \cdot x_{(t+\tau)}}$$

is called as an autocorrelation function of $x_{(t)}$, which is an amount showing how close correlation is held between two values of the stationary stochastic process function $x_{(t)}$, which are obtained at two time points separated from each other by a time length of $\tau$. For example, in the case where those two values obtained at those two time points separated by the time length $\tau$ hold no correlation between them at all, namely, are independent of each other, $$\psi_{(\tau)} = \overline{x_{(t)}} \cdot \overline{x_{(t+\tau)}}$$

so that, $$\overline{x_{(t)}} = \overline{x_{(t+\tau)}} = 0$$

where it is assumed that both of $\overline{x_{(t)}}$ and $\overline{x_{(t+\tau)}}$ contain no DC component. On the other hand, the function $x_{(t)}$ is stationary, and accordingly the amount of the ensemble average $\psi_{(\tau)}$ is not varied by the conversion of $t \rightarrow t + \tau$, so that $$\psi_{(\tau)} = \overline{x_{(t)} \cdot x_{(t+\tau)}} = \overline{x_{(t-\tau)} \cdot x_{(t)}} = \psi(-\tau)$$

that is, the aforesaid autocorrelation function is an even function with regard to the sampling time difference $\tau$.

In contrast therewith, a crosscorrelation function of $x_{(t)}$ is defined by $$\psi_{1,2(\tau)} = \overline{x_{1(t)} \cdot x_{2(t+\tau)}}$$

In the case where two microphones have the same signal transfer characteristics and are distant enough from a sound source, two sound signals converted respectively from two sounds which are emitted from the distant sound source and are received by these two microphones respectively can be regarded as the same signals having a certain phase difference between them. Accordingly, the crosscorrelation function between those two sound signals can be treated as the autocorrelation function of a sound signal derived from a single microphone, which sound signal consists of two components having the same waveforms and a slight time difference with each other.

For example, where the sound source 10 is disposed on a horizontal plane which intersects perpendicularly the axis passing those two microphones 1, 2 at the middle point thereof, it can be noticed with respect to the result of calculation effected in the correlation function calculator 5 that a sound emitted by the sound source 10 arrives at both of those two microphones 1, 2 simultaneously and two waveforms $x_{1(t)}$ and $x_{2(t)}$ of sound signals derived respectively from those two microphones 1 and 2 are the same as follows, $$x_{1(t)} = x_{2(t)}$$

so that, the following result can be obtained.

$$\psi_{(\tau)} = \overline{x_{1(t)} \cdot x_{2(t+\tau)}} = \overline{x_{1(t)} \cdot x_{1(t+\tau)}}$$

On the other hand, when the sound source 9 is positioned in a direction subtending an angle $\theta$ of elevation relative to the two microphones 1, 2 arranged as mentioned above, it can be noticed with respect to the result of calculation effected in the correlation function calculator 5 that the sound received, for instance, by the microphone 2 is converted to a sound signal having a waveform, which is the same as, but recedes by the time length $\tau_0$ a standardized waveform of a sound signal converted from the sound received by the other microphone 1, $$\tau_0 = (r_0/\text{sound velocity}) \sin\theta$$

and $$x_{2(t)} = x_{1(t-\tau_0)}$$

Accordingly, the crosscorrelation function between those sound signals derived from the microphones 1, 2 in the above case is calculated as follows.

$$\psi_{1,2(\tau)} = \overline{x_{1(t)} \cdot x_{2(t+\tau)}}$$
$$= \overline{x_{1(t)} \cdot x_{2(t+\tau-\tau_0)}}$$
$$= \psi_{1(\tau-\tau_0)}$$

Consequently, where the simultaneously generated sounds are received by microphones 1 and 2 substantially at the same time such as in the case where the sound source 10 is disposed on the ground, which is shown in FIG. 2, the waveforms of the sound signals derived from microphones 1 and 2 respectively are equal to each other, so that, when the sampling time difference $\tau$ is settled into zero, that is, $\tau=0$, the amount of the aforesaid ensemble average of respective products between respective signal levels sampled simultaneously, for instance, between both of sampled signal levels positioned respectively at the respective center of the two groups of sampled signal levels relating respectively to those two microphones 1, 2, shows the largest value of crosscorrelation, and then the value of crosscorrelation decreases in accordance with the increase of the sampling time difference $\tau$.

In contrast therewith, where the simultaneously generated sounds are received by microphones 1 and 2 arranged apart with a time difference corresponding to the difference in path length between the sound source and respective microphones 1 and 2 as in the case of the flying sound source 9, which is shown in FIG. 2, the crosscorrelation between respective sampled signal levels having a sampling time difference with each other, which is equal to that corresponding to the difference of path length, is the same as the above mentioned crosscorrelation obtained using the sampling time difference $\tau=0$ where the sound source 10 is disposed on the ground, so that it can be expected that the largest crosscorrelation coefficient is obtained when the sampling time difference is equal to that corresponding to the aforesaid difference in path length.

Figure 3:
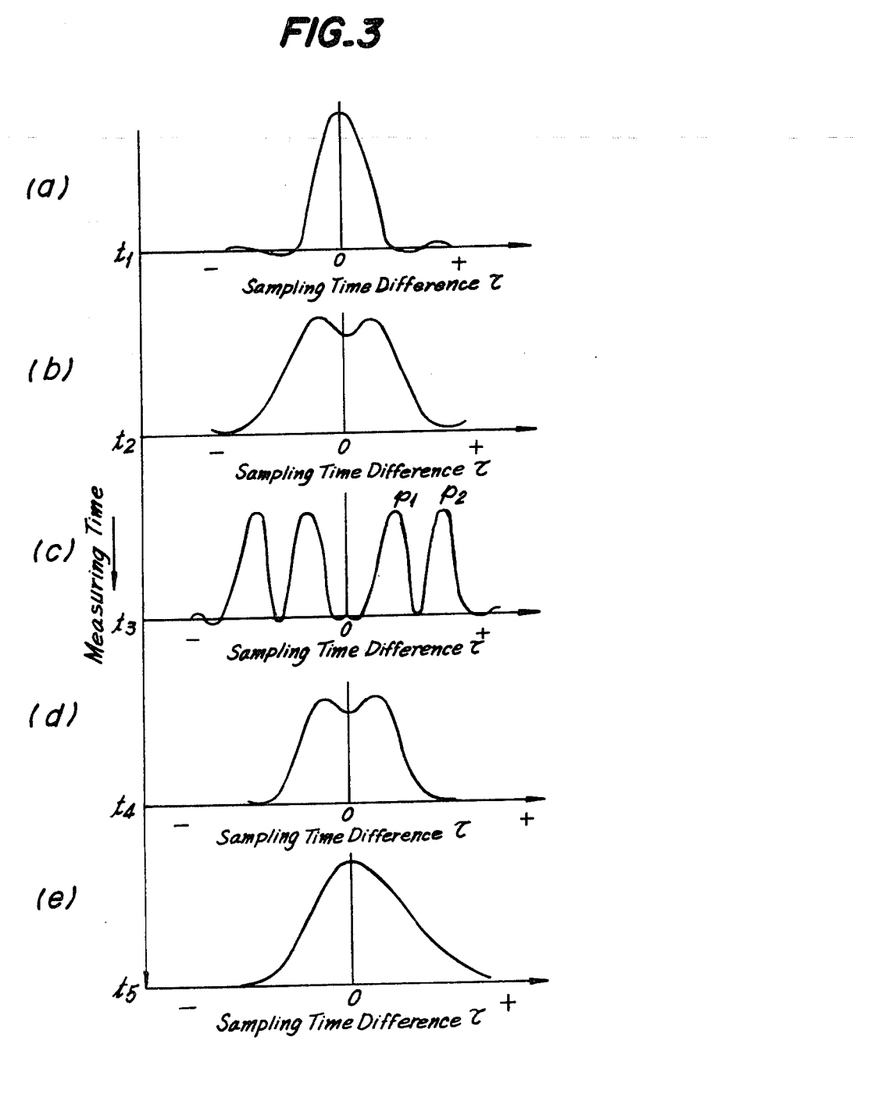

However, with respect to the sound incoming from the sky, the state of correlation differs from that which occurs when the sound source is disposed on the ground because of the addition of the sound reflected by the ground to that incoming from the sky. Because of reflected sounds a pair of maximal values of the crosscorrelation occur which are caused by the effect of the additional incoming sound. In other words, the waveform of the crosscorrelation function signal concerning the sound incoming from the ground is mountain-shaped, that is, so-called unimodal, when the sampling time difference $\tau=0$, as shown in FIG. 3(a), similarly to that which occurs due to the sound incoming from the sound source, for instance, the flying aircraft, disposed infinitely far in the sky, whereas the waveform of the crosscorrelation function signal concerning the sound incoming from the aircraft flying comparatively close to the measuring position shows two maximal values symmetrically corresponding to two sampling time points being distant symmetrically from that of $\tau=0$ by a certain sampling time difference $\tau$ equally, as shown in FIG. 3(c).

Moreover, the above mentioned sampling time difference $\tau$, whereon the maximal value of the crosscorrelation function signal occurs, is varied in accordance with the variation of the incoming time difference of the sound emitted from the flying aircraft between the two microphones arranged apart, which variation is caused by the movement of the sound source, that is, the flying aircraft, as well as the sampling time difference $\tau$, whereon the minimal value appearing between the aforesaid maximal values is likewise varied at the same time.

Accordingly, in accordance with the state of appearance of the maximal and minimal values of the crosscorrelation function signal and the sampling time difference, whereon those values are caused, accompanied with the variation thereof, the incoming sound can be identified or discriminated as to whether or not it originates from a moving sound source, for instance, a flying aircraft, and as to that direction in which the moving sound source is disposed.

The present invention is based on the above mentioned identification of the moving sound source.

In the configuration shown in FIG. 2, the correlation function signal derived from the correlation function calculator 5 is applied to a smoother 6, wherein the featured frequency component showing the above mentioned variation of waveform of the correlation function signal only is extracted by mean of smoothing out the undesired frequency components which are extremely high in comparison with the sampling period. It is because that, with regard to the above mentioned identification or discrimination relating to the correlation function signal, the waveform thereof obtained does not in actuality show a simple and smooth unimodal shape as shown in FIG. 3(a), owing to the additional noisy component left as it is by the too short integrating time duration corresponding to the sampling time period of the sound signal.

The smoothed correlation function signal derived from the smoother 6 is then applied to a differentiator 7, wherein a signal showing the differential coefficient of the smoothed correlation function signal is obtained and then applied to a maximo-minimum detector 8. In the maximo-minimum detector 8, the aforesaid maximal and minimal values of the smoothed correlation function signal are detected on the time axis according to the inclined direction of the aforesaid differential coefficient signal.

In the moving sound source identifying system according to the present invention, in accordance with the sampling time difference $\tau$ between respective sampling time points whereon the aforesaid maximal and minimal values are caused respectively, an angle $\psi$ subtended between the perpendicular axis passing through the two microphones 1, 2 and a line passing through the middle point of those microphones arranged apart and the moving sound source 9 shown in FIG. 2, that is, a direction wherein the moving sound source 9 is positioned at the present measuring time, can be discriminated, and in accordance with the featured waveform itself of the correlation function signal representing the aforesaid maximal and minimal values or the variation of the aforesaid angle $\psi$ representing the direction of the sound source, it can be identified that the sound source is moving.

The principle of the identification of the moving sound source according to the configuration shown in FIG. 2 will be explained further in detail, in the case where it is assumed that the moving sound source is an aircraft passing just above the measuring position whereon the two microphones are arranged perpendicularly.

As shown in FIG. 2, the microphones 1 and 2 are arranged on the perpendicular axis with the heights of $r_1$ and $r_2$ from the ground respectively and with a distance $r_0$ from each other, and the direction pointing to the flying aircraft 9 subtending an angle $\psi$, that is, a complementary angle of that of elevation against the perpendicular axis. In such a case, the distance between those microphones 1, 2 and the flying aircraft 9 is substantially equal to $r_0 \cos \psi$, so that the incoming time difference of $r_0/C \cos \psi$ seconds, where C represents the velocity of sound, occurs between the respective output sound signals derived from the microphones 1 and 2, which sound signals are converted respectively by those microphones from the same sounds emitted by the flying aircraft 9 at the same time.

As mentioned earlier, in accordance with the sampling time difference $\tau$ corresponding to the aforesaid incoming time difference, the crosscorrelation function calculated as the ensemble average of respective products between the respective sampled signal levels consisting respectively in the aforesaid sound signals derived respectively from those two microphones 1 and 2 indicates the aforesaid maximal values, and further the sampling time difference $\tau$ corresponding to those maximal values is varied with response to the variation of the aforesaid incoming time difference of $r_0/C \cos \psi$, which is caused by the movement of the flying aircraft 9.

Accordingly, when the flying aircraft 9, which represents the moving sound source, moves in the horizontal direction at successive measuring time points $t_1, t_2, t_3, t_4, t_5$ and so on, as shown in FIG. 2, the waveform of the correlation function signal derived from the correlation function calculator 5 is varied successively as shown in FIGS. 3(a) to 3(e).

Besides, when the aforesaid angle $\psi = 0$, wherein the flying aircraft 9 arrives just above those two microphones 1, 2 and intercepts the perpendicular axis, that is, at the measuring time point $t_3$, the correlation function signal indicates the waveform shown in FIG. 3(c), the first peak $p_1$ of which is caused according to the incoming time difference $R_0/C$ between the respective sounds which arrive respectively at those two microphones 1 and 2 directly from the flying aircraft 9, and the second peak $p_2$ of which is caused according to the incoming time difference between those sounds arriving directly and those arriving after being reflected by the ground.

As described above, in case the incoming sound is emitted from the flying aircraft only, the correlation function signal indicates the peak value $p_1$ corresponding to the sampling time difference $\tau$ having a certain time length, which is varied with response to the variation of the incoming time difference of the sound, which variation is caused by the movement of the sound sources, that is, the flying aircraft. Accordingly, when the flying aircraft is disposed almost infinitely far away from the measuring position, the incoming time difference can be regarded substantially as zero, and the correlation function signal indicates the unimodal waveform as shown in FIG. 3(a).

When the incoming time difference becomes comparatively larger in accordance with the approach of the flying aircraft, the correlation function signal indicates a bimodal waveform as shown in FIG. 3(b). The distance between two peaks of the bimodal waveform of the correlation function signal increases according to the approach of the flying aircraft. In accordance therewith the signal level of the correlation function signal, which level is obtained at the middle point between the two peaks of the bimodal waveform in case the sampling time difference $\tau = 0$, is lowered gradually. When the flying aircraft arrives just above the two microphones, so that the incoming time difference reaches $r_0/C$, the lowered signal level at the middle point reaches its lowest level where it is so low as to be negligible in comparison with the peak level $p_1$.

As mentioned above, since the sampling time difference $\tau$, corresponding to the first peaks $p_1$ of the correlation function signal, is varied in accordance with the movement of the flying aircraft 9 which represents the moving sound source, an identification can be performed as to whether the sound emitted from a moving sound source, by means of discriminating the variations of the sampling time difference $\tau$ corresponding the variations in the first peak $p_1$. Accordingly, sounds originated from a stationary sound source, for instance, a siren can be discriminated easily from sounds emitted from a flying aircraft, even though the stationary sound source is disposed in the sky like the flying aircraft.

On the other hand, with regard to sounds originated from a moving sound source on the ground, for instance, a running motorcar, which is positioned substantially at the same height on the ground as the sound receiving microphones, the aforesaid angle $\psi$ subtended against the perpendicular axis becomes 90°, namely, $\psi = 90°$, so that the respective angles at which the sounds emitted from the sound source moving on the ground are received by the two microphones 1 and 2 respectively are always substantially equal to each other, regardless of the movement of the sound source on the ground. Accordingly, since there is no incoming time difference between the same sounds catched by the two microphones, the maximal value of the crosscorrelation function of the received sounds is obtained only where the sampling time difference $\tau = 0$.

Furthermore, even where a moving sound source 9 in the sky and a moving or stationary sound source 10 on the ground are present at the same time, and where both of the sounds emitted respectively from sound sources 9 and 10 arrive at the measuring position with comparable sound pressure levels and in a state of mixture, the detection of the aforesaid peaks corresponding to the sampling time difference relating only to the moving sound source in the sky can be easily performed by means of discriminating the desired components from the undesired components of the sound signals derived from the microphones in accordance with the respective filter frequency characteristics of the spectro filters 3 and 4 shown in FIG. 2.

As an aside, since the sampling time difference $\tau$ corresponding to the first peaks $p_1$ of the correlation function signal is determined in response to the incoming time difference $r_0/C \cos \psi$ between the two microphones 1 and 2 receiving the sound emitted from the moving sound source 9 in the sky, the resolvability for the discrimination of the sampling time difference between the maximal and minimal levels of the correlation function signal can be increased by increasing the distance $r_0$ between the two microphones 1 and 2, other measuring conditions remaining unchanged.

According to the results of experiments based on the configuration shown in FIG. 2, when the angle $\theta$ of elevation of the moving sound source 9 in the sky is set at a value of 10°, the first peaks $p_1$ of the correlation function signal shown in FIG. 3(c) appear with the sampling time difference $\tau_{p1} = 0.5$ msec, when the distance $r_0$ between the microphones 1 and 2 is set at a value of 1 m, and the peaks $p_1$ appear with the sampling time differrence $\tau_{p1} = 2.5$ msec, when the distance $r_0$ is set at another value of 5 m, so that in the latter case the resolvability is greatly increased.

The width of the unimodal shape shown in FIG. 3(a) is determined in accordance with the frequency band widths of the sound signals of those band widths are too wide, the signal level corresponding to the sampling time difference $\tau = 0$ is not lowered sufficiently, as shown in FIG. 3(b). However, even under such conditions the first peaks $p_1$ can be separated from each other as shown in FIG. 3(c), by means of increasing the distance $r_0$ between the two microphones 1 and 2, for instance, to the value of 5 m.

However, the distance $r_0$ cannot be increased excessively as an effective difference is then caused with respect to the two sound paths causing the same sound emitted from the moving sound source on the ground to be received by the two microphones 1 and 2 respectively at different time. Thus, it becomes difficult to discriminate between sounds originated emitted from aircraft flying in the sky and sounds emitted from a sound source moving on the ground.

Consequently, with regard to the arrangement of the microphones, it is required to choose respective heights above the ground and the distance between microphones in such a manner that the angle of depression of a sound source moving on the ground can be neglected in comparison with the angle of elevation of a sound source flying in the sky. For instance, in order to enable the discrimination of the incoming sound emitted from the flying aircraft which subtends an angle $\theta$ of elevation exceeding the value of 10°, it is required that the undesired sound source moving on the ground be distanced more than 29 m from the measuring position, in the case where the distance $r_0$ between the two microphones is set at 5 m.

Figure 4:
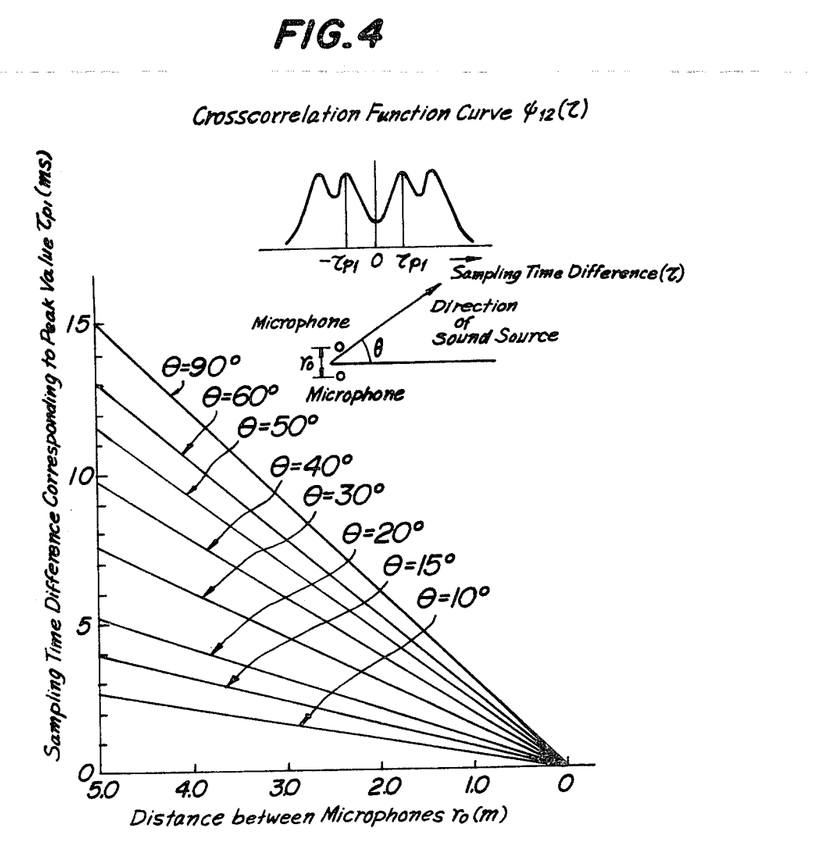
FIG. 4 is a graph showing the relation between the distance separating two microphones and the resolvability of the above embodiment.

FIG. 4 shows the relationship between the distances $r_0$ between the microphones arranged apart as shown in FIG. 2 and the sampling time differences $\tau_{p1}$, corresponding to the first peaks $p_1$ of the correlation function signal being produced, that is, the resolvability of the discrimination of those peaks $p_1$, with respect to various values of the angle $\theta$ of elevation subtended against the moving sound source in the sky.

Figure 5:
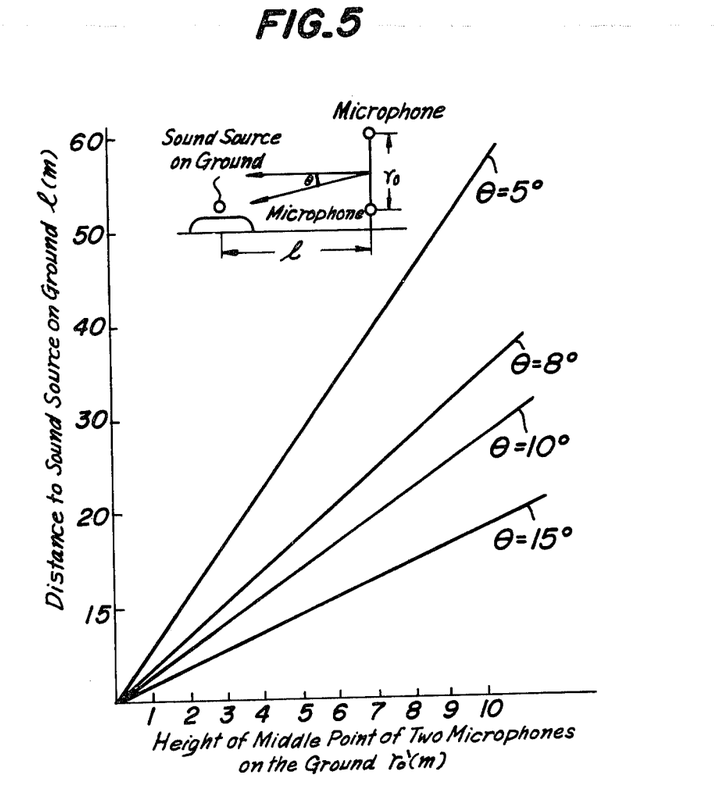
FIG. 5 is a graph showing the relation between the height of the middle point of two microphones and the distance separating a sound source positioned on the ground from the measuring position.

On the other hand, FIG. 5 shows the relationship between the height of the middle point of the two microphones above the ground and the distances between microphones and sound source whereby the undesired moving sound source on the ground should be distanced from the microphones by the distances 1, with respect to various values of the angle of depression subtended against the undesired moving sound source.

Figure 6:
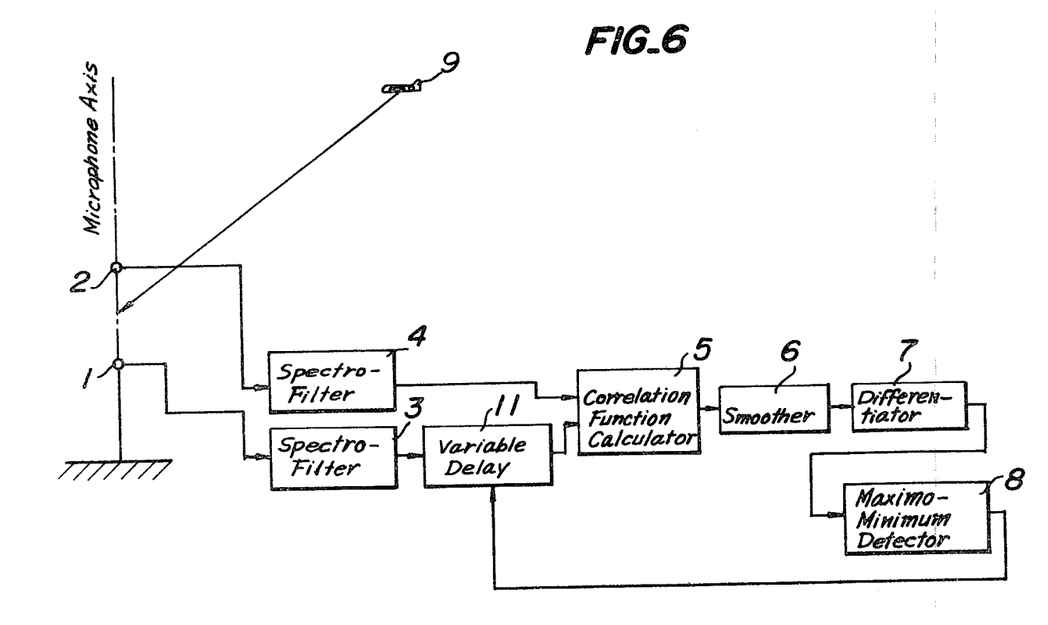
FIG. 6 is a block diagram showing another preferred embodiment of the moving sound source identifying system according to the present invention.

Another example of the configuration of the moving sound source identifying system is shown in FIG. 6. In the configuration shown in FIG. 6, which is almost similar to that shown in FIG. 2, a conventional variable delaying device 11 is connected between, for instance, the spector filter 3 corresponding to the microphone 1 and the correlation function calculator 5. After it can be certified similarly as mentioned earlier in respect to the configuration shown in FIG. 2 that the incoming sound originated from the moving sound source is received by the microphones provided for identifying the moving sound source, the delay time effected by the aforesaid variable delaying device 11 is controlled with response to the output signal of the maximo-minimum detector 8, so as to shift the respective sampling times from each other, whereon the sound signals derived from the microphones 1 and 2 respectively are sampled respectively, in such a manner that, when the flying aircraft 9 is positioned just above the microphones 1, 2, the incoming time difference of the sounds emitted from the flying aircraft 9 reaches the maximum value of $r_0/C$, or, when the flying aircraft 9 arrives at least at the possibly nearest position, the incoming time difference reaches to the first maximal value, so that the maximal or minimal values are produced in response to the sampling time difference being equal to the controlled delay time. Consequently, it is possible to pursue automatically the flying aircraft representing a typical moving sound source, by means of discriminating the angle $\psi$ or the angle $\tau$ of elevation of the flying aircraft 9 in accordance with the calibration of the above controlled delay time.

Furthermore, in place of the above mentioned electrical automatic pursuance according to the added variable delaying device 11, it is possible also to pursue the flying aircraft 9 mechanically by means of deflecting the direction of the axis whereon the two microphones are arranged.

Figure 7A:
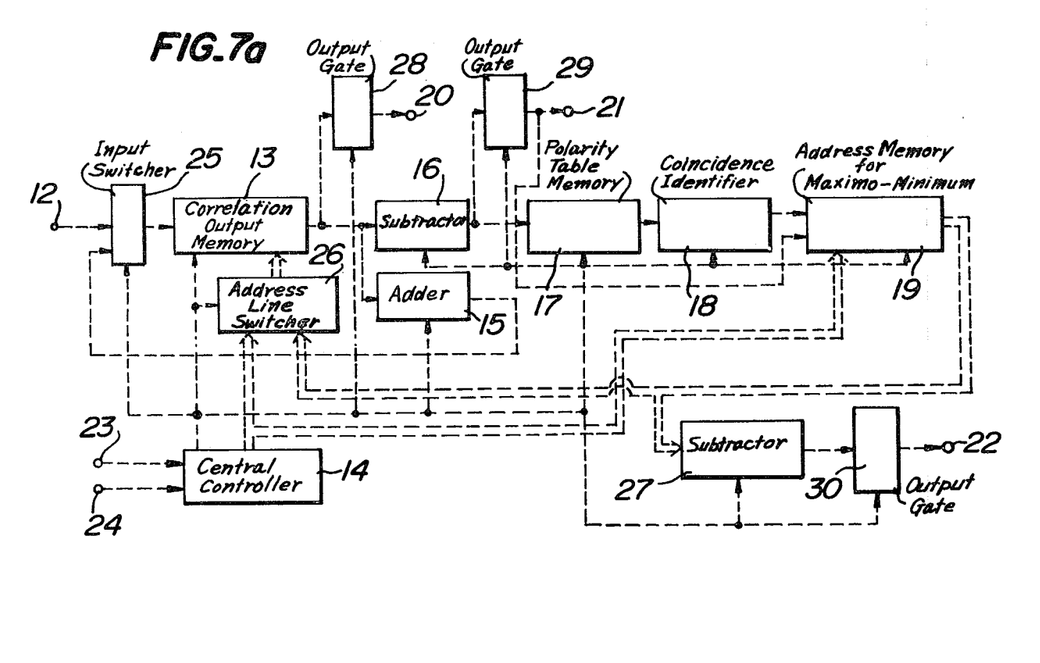
FIG. 7(a) is a block diagram showing an example of circuit arrangements wherein a smoother, a differentiator, a maximo-minimum detector and a sound source identifier consisting all in the embodiments shown in FIGS. 2 and 6 are included on the whole.

FIG. 7(a) shows an example of circuit arrangements provided for conducting the identification and automatic pursuance of the moving sound source according to the present invention, wherein the smoother 6, the differentiator 7 and the maximo-minimum detector 8 shown in FIGS. 2 and 6 and further an additional sound source identifier are included on the whole.

In the identifying system according to the present invention, the calculation of sampled values of the sound signal levels is conducted for obtaining the cross-correlation function with regard to the sound signal, and further it is desired to miniaturize and to lighten the circuit arrangements according to the present invention by means of integrating those arrangements, so that it is preferable to digitize the correlation function signal formed in the correlation function calculator 5. Accordingly, the circuit arrangements shown in FIG. 7(a) is arranged in conformity with the treatment of the digitized correlation function signal.

In the configuration shown in FIG. 7(a), controlling systems are indicated by single broken lines, and addressing systems are indicated by double broken lines, and the respective portions included in the configuration shown in FIG. 7(a), which portions correspond to the smoother 6, the differentiator 7, the maximo-minimum detector 8 and the sound source identifier respectively are shown individually in FIGS. 7(b) to 7(e), wherein the corresponding portions are indicated by solid lines.

Figure 7B:
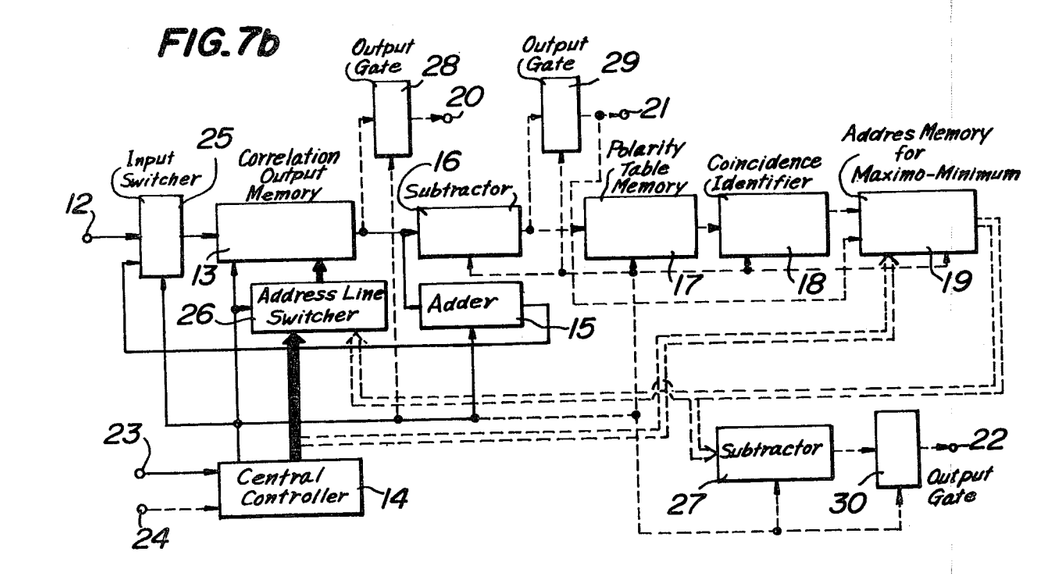
FIG. 7(b) is a block diagram showing the configuration of the smoother included in the circuit arrangements shown in FIG. 7(a)

In the first place, in the configuration shown in FIG. 7(b) corresponding to the smoother 6, the digitized correlation function signals applied to the input terminal 12 are written into a correlation output memory 13 through an input switcher 25 successively, and then, in order to remove noisy components from the output data derived from the memory 13, so as to enable the discrimination of the most possibly accurate and appropriate correlation, three or five output data neighboring to each other are added in an adder 15 so as to smooth the waveform of the correlation function signal. Those smoothed data derived from the adder 15 are supplied to the other input terminal of the input switcher 25, which is driven by a central controller 14 so as to feed back smoothed output data to the correlation output memory 13 and then to register those smoothed data in place of the original data successively.

Figure 7C:
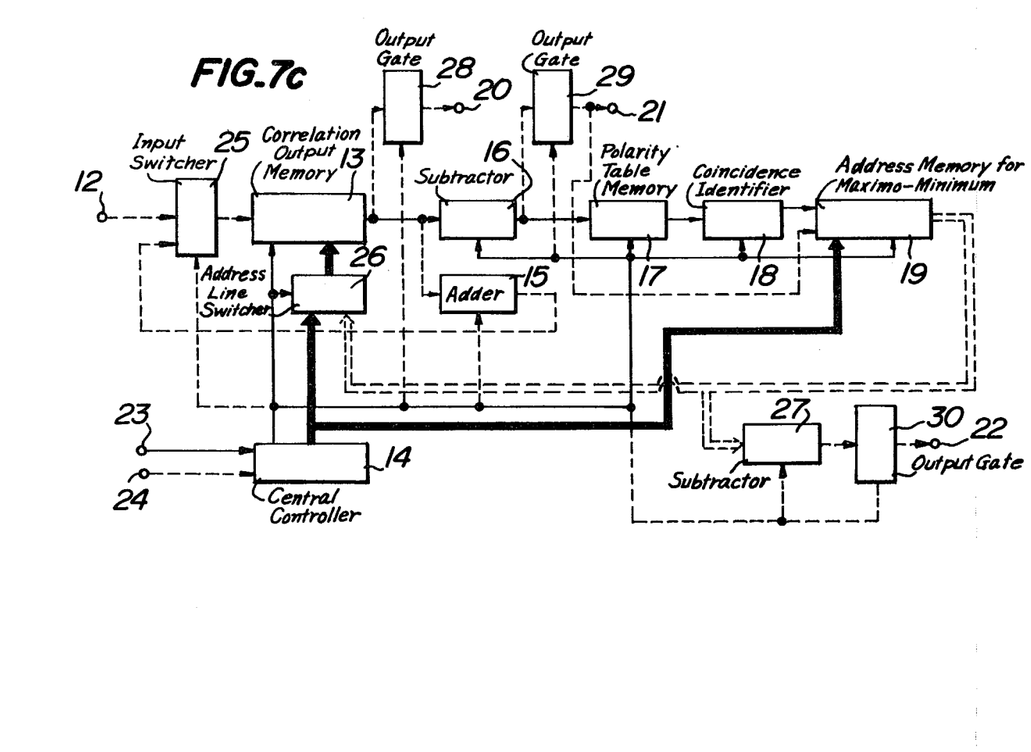
FIG. 7(c) is a block diagram showing the configuration of the differentiator and the maximo-minimum detector included in the circuit arrangements shown in FIG. 7(a)

In the second place, in the configuration shown in FIG. 7(c) corresponding to the differentiator 7, the smoothed output data derived from the correlation output memory 13 are supplied to a subtractor 16 successively, wherein the datum preceding by a sampling period is subtracted from the succeeding datum successively. In case the subtracted result is "+", an output digit of "1" is derived from the subtractor 16, while, in case the subtracted result is "−", an output digit of "0" is derived from the subtractor 16, and then those output digits are written into a polarity table memory 17 successively. The output digits of "1" or "0" derived from the polarity table memory 17 are supplied to a coincidence identifier 18 successively, so as to discriminate maximal and minimal values of the correlation output data. Namely, in the coincidence identifier 18, a changing point, whereat the correlation output data are changed from "+" or "1" to "−" or "0", is detected, and an address corresponding to the changing point is stored in an address memory for maximo-minimum 19 as a maximal point. In contrast therewith, another changing point, whereat the correlation output data are changed from "−" or "0" to "+" or "1", is detected in the coincidence identifier 18, and another address corresponding to the other changing point is stored in the address memory for maximo-minimum 19.

Figure 7D:
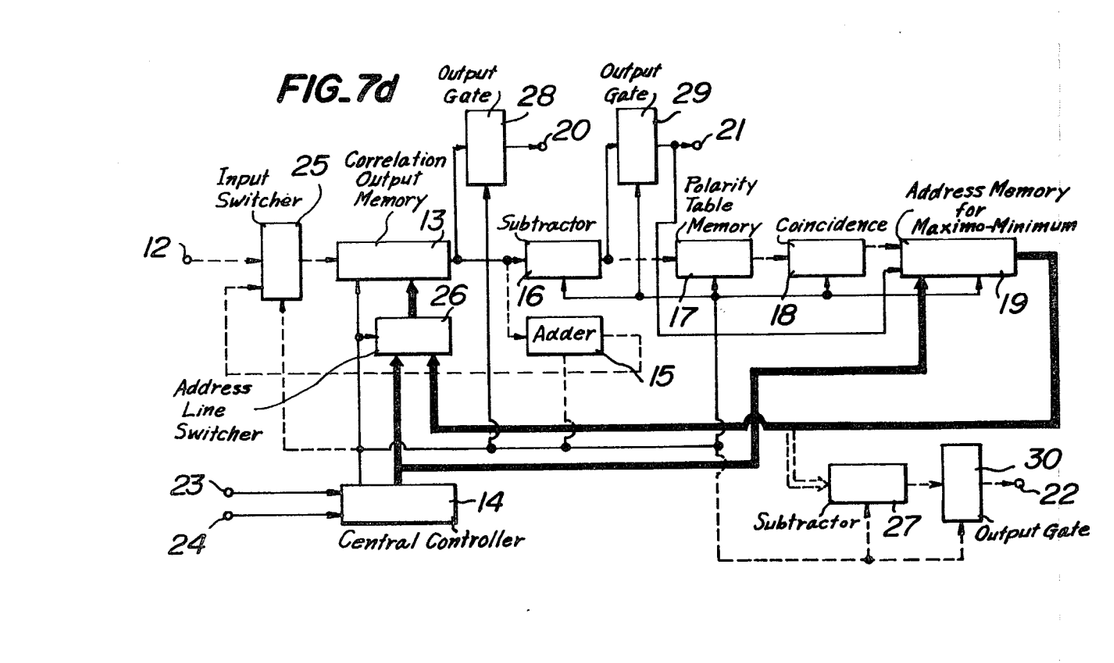
FIG. 7(d) is a block diagram showing the configuration of the sound source identifier included in the circuit arrangements shown in FIG. 7(a) and used for discriminating the incoming direction of the sound departing from the sound source.

In the third place, the configuration shown in FIG. 7(d) is arranged for discriminating the direction wherein the aimed sound source is positioned. In the configuration shown in FIG. 7(d), the standardized correlation output datum registered at the address corresponding to the sampling time difference $\tau=0$ derived from the correlation output memory 13 is subtracted from the correlation output data derived from the correlation output memory 13 in accordance with the addresses corresponding respectively to the sampling time differences $\tau_1$ and $\tau_2$, in response thereto the aforesaid first peaks $p_1$ and the second peaks $p_2$ of the correlation function signal are respectively produced, which addresses are derived from the address memory for maximo-minimum 19 and then are applied to the correlation output memory 13 through an address line switcher 26 in the subtractor 16. In case the subtracted result is positive, that is, $\psi(\tau_i) > \psi(\tau_0)$, the sound source is identified as being disposed in the sky, so that the addresses corresponding respectively to the sampling time differences $\tau_1$ and $\tau_2$ in the address memory for maximo-minimum 19 is not altered at all, while, in case the subtracted result is negative, that is, $\psi(\tau_i) < \psi(\tau_0)$, the sound source is identified as being disposed on the ground, so that the addresses in the address memory for maximo-minimum 19 is altered to that of $\tau_0$.

The results of the above identification of the direction wherein the sound source is disposed is derived from an output terminal 21 through an output gate 29. In addition, the peak value of the smoothed correlation output data is derived from an output terminal 20 through an output gate 28.

Furthermore, in response to the successive supply of the correlation output data from the input terminal 12 to the correlation output memory 13, the successive treatments of the correlation output data, which are mentioned above by referring to FIGS. 7(b) to (d) respectively, are repeated, and each time in this repetition, the aforesaid addresses memorized in the address memory for maximo-minimum 19 are renewed successively.

Figure 7E:
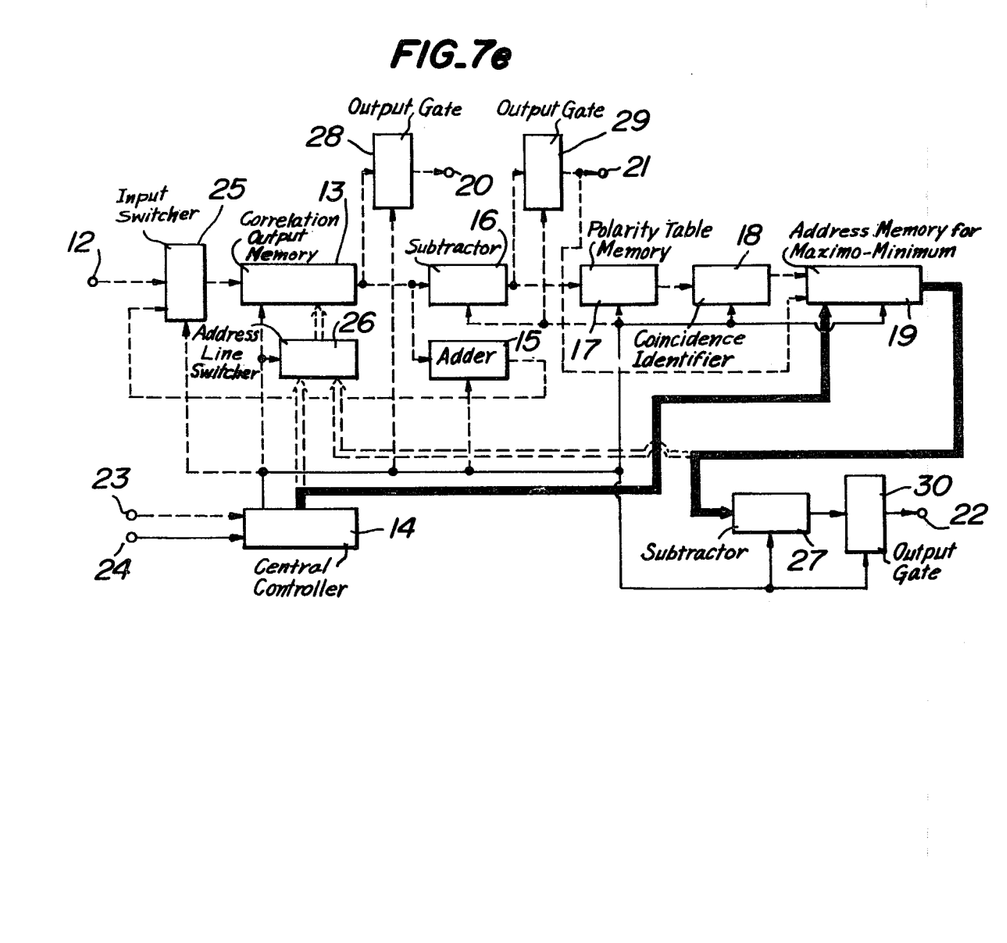
FIG. 7(e) is a block diagram showing the configuration of the sound source identifier included in the circuit arrangements shown in FIG. 7(a) and used for identifying whether the sound source is moving or stationary by means of comparing successive results of the discrimination of the incoming direction, which is effected by that shown in FIG. 7(d).

In the last place, the configuration shown in FIG. 7(e) is arranged for discriminating whether the sound source is moving or stationary by means of comparing the successively renewed addresses one after another, which correspond successively to the sampling time differences and in response thereto the produced peak values of the correlation output data. In the configuration shown in FIG. 7(e), the successively renewed addresses derived from the address memory for maximo-minimum 19 are supplied to a subtractor 27 successively, wherein the subtraction is conducted successively between those renewed addresses succeeding one another. In the case where the subtracted result is zero, that is, where no change occurs between the successively renewed addresses corresponding successively to the sampling time differences and in response thereto the produced peak values of the correlation output data, it is identified that the sound source is stationary, while, in the case where the subtracted result is not equal to zero, that is, where a certain change occurs between those successively renewed addresses, the sound source is identified as moving. These subtracted results are derived from an output terminal 22 through an output gate 30, so as to be used for the aforesaid electrical or mechanical automatic pursuance of the sound source, such that the subtracted result is always maintained equal to zero.

In order to conduct the completely automatic pursuance of the moving sound source in practice, it is required to perform the above mentioned treatment of the correlation output data with regard to both of the vertical and horizontal arrangements of at least two microphones so as to discriminate both the angle of elevation and the bearings of the sound source.

As explained above, according to the present invention, it is possible to identify a sound emitted by a moving sound source and to conduct an automatic measurement of the incoming direction of the sound source, even if the level of the background noise at the measuring position is extremely high. It is also possible to provide the moving sound source identifying system, whereby the identification of the moving sound source can be performed automatically and continuously for an extremely long time even if the measuring position is located in a severe environment as mentioned earlier in relation to the object of the present invention, which system can be utilized for automatically watching for circumferential noise caused by aircrafts.

By using the moving sound source identifying system of the present invention in conjunction with broadcast reception apparatus, suitable preventive measures for avoiding the disturbance of the noise caused by a flying aircraft can be taken, for instance, in such a manner that the loudness of sounds reproduced by the receiver is increased sufficiently enough to overcome the noise in response to the early detection of the approach of the flying aircraft.

Furthermore, according to the present invention, it is possible to discriminate a sound source moving in a vertical imaginary plane settled close to the measuring position from another sound source moving in another vertical imaginary plane settled distant from the measuring position, and to discriminate moving sound sources from stationary sound sources, so that it is possible also to conduct the automatic measurement concerning the noise caused by a motorcar moving on a road or the circumferential noise caused, for instance, by construction work, by means of using two microphones arranged horizontally along the road.

Moreover, it is possible also according to the present invention to improve the accuracy and reliability of various kinds of automatic noise measurements to a large extent.

What is claimed is:

1. A moving sound source identifying system comprising a plurality of sound receiving means arranged apart from each other on an axis crossing a moving direction of a moving sound source,
    a plurality of filtering means provided for extracting respectively a plurality of sound signals in a predetermined frequency band which are respectively formed of sounds emitted from said moving sound source and received by said plurality of sound receiving means,
    a correlation function calculating means provided for forming a cross correlation function signal representing a short interval cross correlation function relating to said plurality of received sound signals,
    a maximo-minimum detecting means for detecting at least one of a maximum and minimum level of said correlation function signal, the time of occurrence of said maximum and minimum levels varying in accordance with the angle of elevation of said moving sound source,
    an identifying means for discriminating the variations in the time of occurrence of said maximum or minimum levels to identify a moving sound source,
    a smoothing means provided for smoothing said correlation function signal derived from said correlation function calculating means in respect to a time axis whereon said short interval correlation function is calculated so as to remove undesired higher frequency components from said correlation function signal, and
    a differentiating means provided for differentiating said correlation function signal derived from said smoothing means and for supplying the differentiated correlation function signal to said maximo-minimum detecting means.

2. A moving sound source identifying system as claimed in claim 1 wherein said identifying means identifies the moving direction of said moving sound source with respect to the axis on which said plurality of sound receiving means are arranged by discriminating the variation of respective times at which at least one of the maximum and minimum levels of said correlation function signal occur.

3. A moving sound source identifying system as claimed in claim 1, wherein said axis whereon said plurality of sound receiving means are arranged is disposed in a direction substantially perpendicular to the ground so as to identify a flying aircraft as said moving sound source.

4. A moving sound source identifying system as claimed in claim 1, wherein said axis whereon said plurality of sound receiving means are arranged is disposed substantially horizontally on the ground so as to identify a vehicle moving on the ground as said moving sound source.

5. A moving sound source identifying system as claimed in claim 1, wherein said correlation function calculating means comprises at least one shift register means, in which a plurality of groups of sample levels formed by sampling said plurality of sound signals at a predetermined short interval are registered successively, said correlation function calculating means calculating respective products between successive sample levels, which belong to one of said plurality of groups of sample levels, preceding and succeeding respectively a standardized sample level positioned at a center of another of said plurality of groups of sample levels and said standardized sample level, which successive sample levels are derived in parallel from said shift register means, so as to obtain a mutual correlation function between said plurality of sound signals as a set average of said respective products obtained successively in said predetermined short interval.

6. A moving sound source identifying system as claimed in claim 1, further comprising
    a delay means provided for delaying said sound signal extracted by one of said plurality of filtering means and for applying the delayed sound signal to said correlation function calculating means, the delay time of said delay means being controlled by an output signal of said maximo-minimum detecting means, so as to enable the discrimination of said moving direction of said moving sound source relative to said axis whereon said plurality of sound receiving means are arranged in accordance with said delay time.

7. A moving sound source identifying system as claimed in claim 6 further comprising, means for automatically pursuing said moving sound source in accordance with said delay time of said delay means.

8. A moving sound source identifying system as claimed in claim 1, wherein said smoothing means, said differentiating means and said maximo-minimum detecting means are formed as a circuit comprising at least
    a memory means provided for successively storing said correlation function signal which is derived from said correlation function calculating means and which is digitized,
    an adder means provided for smoothing said correlation function signal derived from said memory means by means of adding successive digitized components of said correlation function signal and for substituting the smoothed correlation function signal for the original correlation function signal stored in said memory means,
    a subtractor means provided for subtracting successively each digitized component from the respectively succeeding digitized component of said smoothed correlation function signal derived from said memory means,
    a polarity discriminating means provided for discriminating a polarity of an output signal of said subtractor means, so as to detect at least one of a maximum level and minimum level of said smoothed correlation function signal, and an address memory means provided for successively storing addresses of said memory means, which addresses correspond respectively to at least one of a maximum level and minimum level detected by said polarity discriminating means.

* * * * *